United States Patent

Johnson et al.

[15] 3,677,465

[45] July 18, 1972

[54] METHOD AND APPARATUS FOR AUTHENTICATION OF INFORMATION RECORDS

[72] Inventors: Everett A. Johnson, 15 S. Prospect Avenue, Park Ridge, Ill. 60068; Daniel Silverman, 5969 S. Birmingham, Tulsa, Okla. 74105

[22] Filed: Sept. 21, 1970

[21] Appl. No.: 74,066

Related U.S. Application Data

[63] Continuation-in-part of Ser. No. 60,399, Aug. 3, 1970.

[52] U.S. Cl. ..........................235/61.7 R, 355/41, 346/76 L, 235/61.11 E

[51] Int. Cl. ..........................G06k 5/00

[58] Field of Search ..............352/23, 24, 92; 353/68; 355/6, 355/40, 41; 356/71; 226/9; 235/61.11 E, 61.12; 219/121 L; 346/76 L; 235/61.7 R, 61.7 B

[56] References Cited

UNITED STATES PATENTS

| | | | |
|---|---|---|---|
| 3,267,800 | 8/1966 | Baillod | 355/41 |
| 2,975,282 | 3/1961 | Schaffer | 355/40 |
| 2,621,560 | 12/1952 | Steinhardt | 355/41 |
| 3,325,819 | 6/1967 | Fraser | 219/121 L |

*Primary Examiner*—Thomas A. Robinson
*Attorney*—Daniel Silverman

[57] ABSTRACT

This invention is concerned with apparatus and methods for unerasably marking computer and other information documents in a precise, machine readable manner so as to identify the particular document, and to control access to the information stored thereon. The method involves preparing a master card of opaque material, through which microperforations have been burned in a predetermined pattern by a laser. This card is used as a pattern for a second laser, passing through the microperforations to burn an identical pattern through a facsimile card and/or through an opaque layer of the document, such as a digital photographic film or magnetic tape. The facsimile card is used, in conjunction with a reading means, to detect the pattern, identify the document and to control the operation of a computer to utilize the information on the document.

24 Claims, 14 Drawing Figures

Patented July 18, 1972 3,677,465

2 Sheets-Sheet 1

DANIEL SILVERMAN
EVERETT A. JOHNSON INVENTORS

BY Daniel Silverman
their Agent.

INVENTORS
DANIEL SILVERMAN
EVERETT A. JOHNSON
BY Daniel Silverman
their Agent.

METHOD AND APPARATUS FOR AUTHENTICATION OF INFORMATION RECORDS

This application is related to and is a continuation-in-part of an application of Daniel Silvermon, one of the co-inventors of this application, entitled: Method and Apparatus for Preparing Master and Facsimile Digital Spot Records, and filed Aug. 3, 1970, and identified by the Ser. No. 60,399.

PRIOR ART

One of the problems of identification and security in large computer installations is the identification of a particular record. For example reels of magnetic tape are generally marked with a code that might indicate general subject matter as well as ownership. These markings are generally on the reel, the reel case and/or on the tape leader. However, these can all be readily changed by obvious methods. Also, in the matter of security there is no really satisfactory way of preventing an unauthorized user from taking a reel of restricted information tape and reading it off the tape into a computer or transcribing it onto a second tape.

OBJECTS OF THE INVENTION

The objects of the invention can be expressed as follows:

1. to authenticate the ownership of the information record,
2. to provide an unerasable, machine readable index of identity and/or ownership that is impossible readily to identify without a facsimile of the index pattern,
3. to provide a type of pattern that is distributed over an appreciable length of the record so that it cannot be removed by excising a terminal portion of the record,
4. to provide an authentication system that can be applied to (a) magnetic tapes and cards, (b) microfilms and microfiche, and (c) punched paper tapes and cards, etc,
5. to provide methods and apparatus for controlling the operation of a data reading machine to prevent or modify its operation if the pattern of authentication on the medium does not agree with the pattern of a facsimile card inserted into the machine to read the authentication,
6. to provide a method of manufacture of the originals and facsimile card copies of the characteristic authentication patterns of different owners, and
7. to provide a method of authentication of an extended length record medium that can be applied throughout the length of the medium without affecting its use as a data carrying record.

GENERAL DESCRIPTION OF THE INVENTION

The invention will for convenience, be described in a general way with regard to authenticating a magnetic tape record.

A magnetic tape can be identified as to ownership and to data content by a. man readable markings on the reel on which the tape is wound, b. man readable markings on the ends of the tape or on the tape leaders.

Both of these systems can be altered at will by rewinding onto another reel, or by cutting off the end of the tape or the leader. The system of this invention is unerasable, can be made to be unreadable by the naked eye, but easily readable by machine. It can be applied at the ends and also at precisely determined positions along the length of the strip or tape.

In one form, the invention provides for applying to the magnetic tape a precisely focussed laser beam that can burn small holes through the magnetic coating in a specific pattern to form transparent spots through the coating that can be read by reflection or by transmission through the transparent plastic backing strip. The laser can be applied through a corresponding pattern of holes in a thin metal plate or card, originally burned through the metal card by laser beam. Similarly the pattern can be read photoelectrically by using a facsimile plate and determining whether the pattern on the magnetic tape is identical with that on the facsimile card.

DESCRIPTION OF THE DRAWINGS

These and other objects of the invention and a better understanding of the invention will be apparent from the following detailed description taken in connection with the attached drawings, in which:

FIGS. 4*a*, 4*b*, 4*c* illustrate two types of spot patterns.

DESCRIPTION OF THE EMBODIMENTS

This invention is applicable to all types of information storage media, but will be described in terms of magnetic digital tape. The purposes of the authentication are:

1. to represent in a permanent, unerasable, non-counterfeitable manner the ownership of the tape,
2. to ensure that when the data on the tape is to be used in a computer, or transcribed to another magnetic tape or to an archival record medium, the tape and the data on it are of the proper ownership,
3. to ensure that when the tape is to be used in the computer in a specific program, the computer will not accept the data unless the tape authentication pattern is present and is the correct one.

Figures 1, 2, 3, 7A, 7B, 7C, 7D:
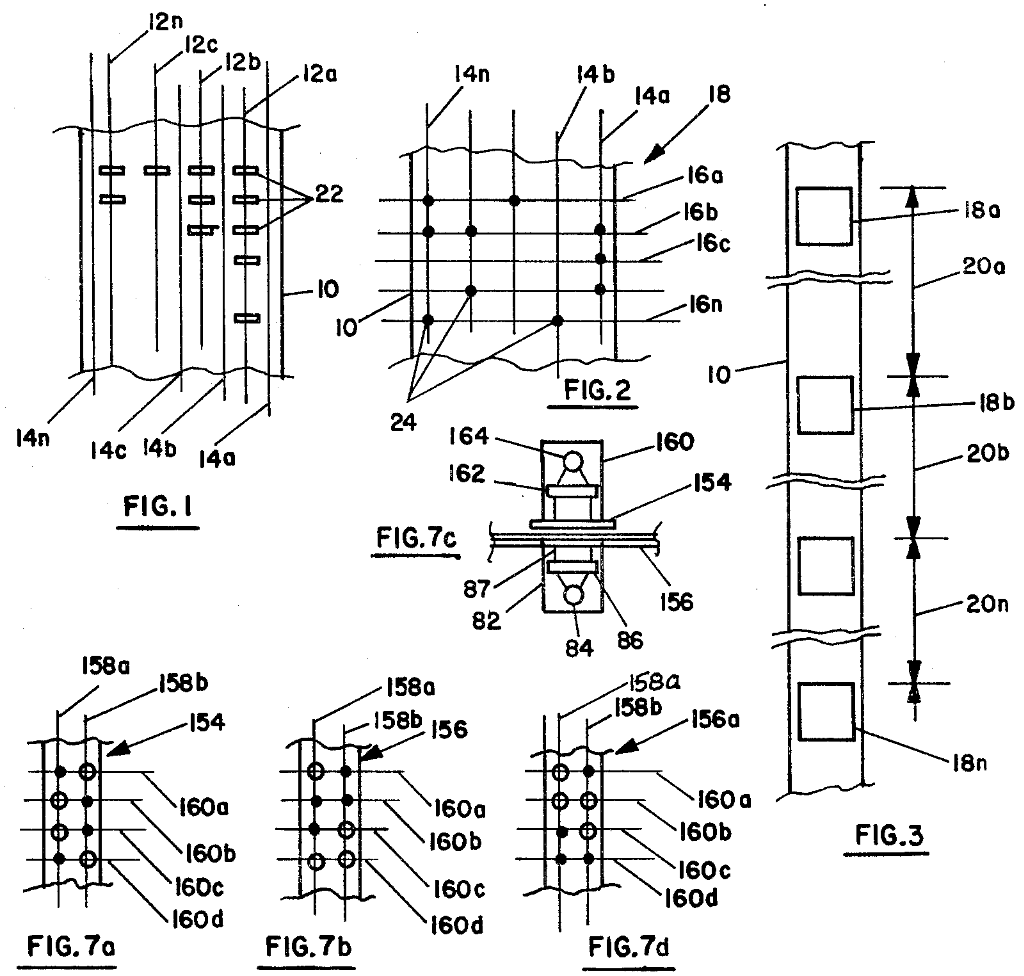
FIG. 1 represents a portion of an information record to which this invention can be applied.
FIG. 2 illustrates one possible embodiment in the form of a pattern of spots applied to a portion of an information strip.
FIG. 3 illustrates how the pattern of FIG. 2 can be applied at a plurality of positions along a strip record.
FIGS. 7*a*, 7*b*, 7*c* and 7*d* illustrate a special coding system and apparatus for reading the coded pattern.

One form of authentication is to provide (as in FIGS. 1, 2 and 3) a characteristic pattern of machine recognizable spots. These are placed in positions on the tape which are not used in the normal information storage process. FIG. 1 shows such a tape 10 with magnetized spots or areas 22 arranged in tracks 12*a*, *b-n*.

In the intertrack spaces 14*a*, *b*, *-n* are placed markings, spots or small areas of a unique character that is readable by machines of a special nature. In FIG. 2 are shown a plurality of spots 24 in a two-dimensional array of spots arranged on longitudinal lines 14 (in the intertrack areas) and transverse spaced lines 16, *a*, *b-n*. The pattern 18 of spots 24 is a unique (one of a kind) pattern which is used to authenticate the tape. Each owner will have a different unique pattern. The invention contemplates also using a plurality of similar patterns 18*a*, 18*b* - 18*n* arranged along the tape in a second unique pattern of spacings or distances, 20*a*, 20*b*, 20*n* etc. Thus, by the nature or character of the individual spots 24, by the unique spacing pattern 20 of the patterns 18 along the tape 10 is the authentication and ownership of the tape confirmed.

Figures 4, 8, 9, 10, 11:
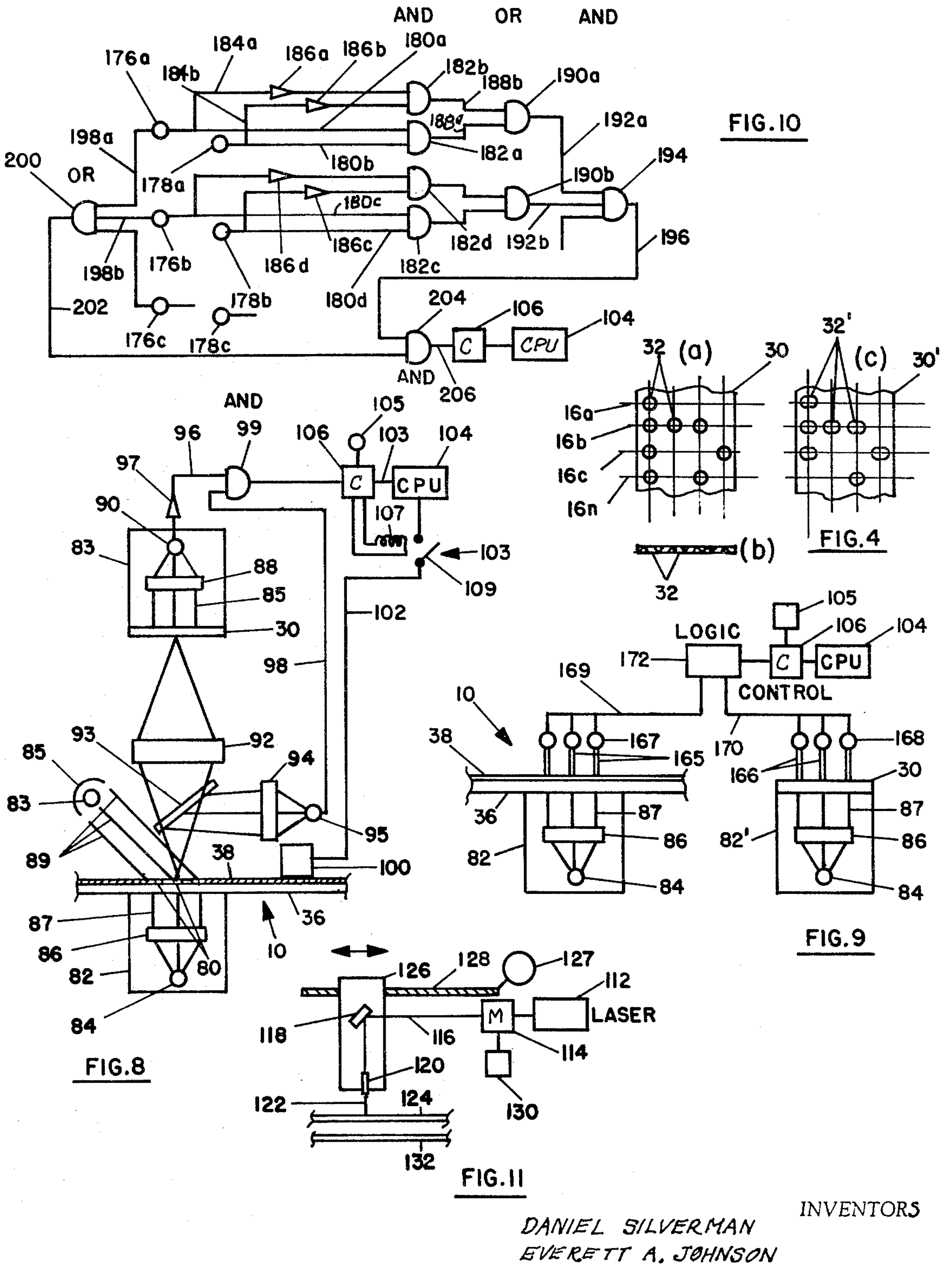
FIG. 8 represents an improved apparatus for reading the pattern.
FIGS. 9 and 10 represent a preferred embodiment of this invention.
FIG. 11 illustrates apparatus by which the master and facsimile cards can be produced.

In FIGS. 4*a*, 4*b*, are shown a pattern card 30 which can be a thin opaque card with a plurality of transparent or perforated areas or spots 32 arranged in a unique pattern. This pattern is characteristic of a specific owner or client, all of whose digital storage media are to be authenticated with this pattern. In general, the spots will be microscopically small so that they can be placed in the inter-track spaces without affecting the operation of the magnetic tape in its normal use. Also complex patterns can be used that are more difficult to copy or counterfeit. These pattern cards can be constructed as shown in FIG. 11. Here a thin sheet 124 of high melting or boiling temperature metal is placed in conjunction with a laser 112, light modulator 114, mirror 118 and optics 120 which focusses the laser light 116 to a spot 122 of small area and high energy density, sufficient to burn a hole through the thin metal 124. The mirror 118 and optics 120 are carried on a frame 126 which is adapted to be precisely positioned in perpendicular coordinates (only one of which is shown) by screw means 128 and motor 127, as is well known in the art. The optics 120 is positioned at predetermined coordinates representing the desired pattern, and the holes are burned. These are very small, of the order of a few ten thousandths of an inch in diameter.

This pattern card or plate 124 is now the master pattern card and is carefully stored and guarded. Facsimile copies, such as 132 can be made in precisely the same pattern. One way to do this is to use the original card 124 as a template to control light passage to the facsimile card 132. The control 130 is used to weaken the beam 116 so that the card 124 will not respond to the laser beam and be evaporated further. However, the facsimile card 132 can be made of lower boiling temperature material, so that it will selectively respond and evaporate with a beam that will not burn 124. The carriage 126 is moved through a raster of positions such that as the beam 122 passes over the openings in 124 the light will pass through these openings and burn through the sheet 132. Sheet 124 can, for example, be titanium or any other of the exotic high temperature metals. Sheet 132 can be aluminum or copper or other relatively low melting temperature metal. Also the facsimile 132 can be a photographic film that can be exposed to a luminous source through the openings in 124. Also it can be a plastic sheet with an opaque coating that can be burned off or evaporated by the laser beam. One such type of coating is a fully exposed and developed (black) opaque silver halide emulsion on plastic film. Another type of medium would be a strip of plastic with a very thin layer of metal applied by evaporation onto the plastic strip, in vacuum. It will be clear also that a certain intensity of the laser beam will be required to burn perforations in the magnetic film on the plastic magnetic strip, which must be less than the intensity of the beam to burn holes in facsimile 132.

It will be clear that the process of removing material such as metal of the plate, or metal or other opaque coating on a transparent base, by the heat of the focussed laser beam can be called evaporation, oxidation, burning or similar term, all of which will be considered equivalent in this application.

Figure 6:
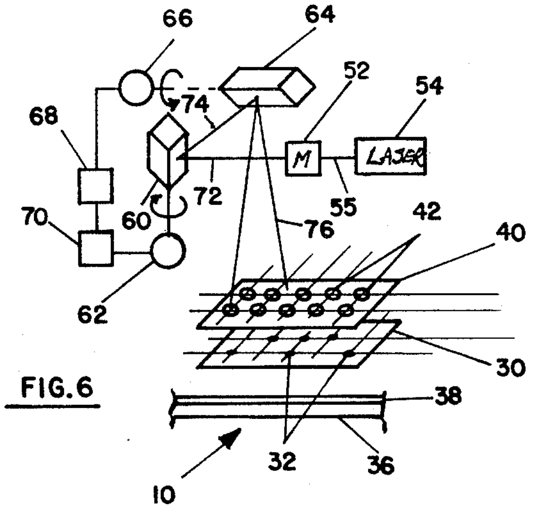
FIGS. 5 and 6 illustrate two methods of recording an authentication pattern on an information record.
Figure 5:
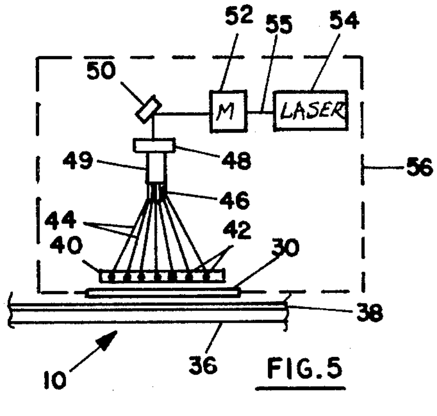

Having the pattern facsimile card, FIGS. 5 and 6 illustrate embodiments of this invention in which the facsimile is used to control the placement of the authentication pattern onto the record medium. In FIG. 5 is shown the magnetic tape 10, with plastic base 36 and evaporizable meltable or oxidizable thin opaque layer 38. The tape 10 is adapted to be transported longitudinally beneath the facsimile card 30, with its pattern of spots (not shown). Placed above the card 30 is a board 40 with a matrix of small lenses 42 held in the board. The card 30 and frame 40 are held in fixed relative position by guides (not shown) so that the spots in 30 are precisely positioned in the matrix of lenses. Light is conducted to the lenses by means of optical fibers 44 that are gathered together at their other ends 46 to a small area, exposed to the light. A laser 54 has a beam 55 passing through light modulator 52, to mirror 50, and to optics 48 which impresses its intense light onto the ends 46 of the optical fibers. Thus all the lenses in the plate 40 have light impressed on them. Those lenses 42 in matrix positions matching the spots in the facsimile card 30 will pass light through the openings in the facsimile card focussed on the layer 38 of the tape 10. The light from the laser exposed through the lenses and focussed on the card 30 is controlled by modulator 52 to be intense enough to burn holes through the opaque layer 38 forming transparent spots on the tape in the pattern of the facsimile card 30. In the mechanism of FIG. 5 the pattern of spots is impressed on the tape 10 simultaneously and rapidly, so that the recording of the spots can be done with the tape moving. In such case (such as where the spots are recorded by using the intense light of a pulsed laser, or when a short intense pulse of a continuous gas laser is used, the pattern of 30 can be repeated at intervals along the strip, the positions of which are coordinated with means in the tape handling unit well known in the art, that measures length or position along the tape. The positions, or distances 20 along the tape (FIG. 3) are chosen in a characteristic pattern, which provides additional secrecy and authenticity to the authentication of the record tape.

It will be clear that modifications can be made in FIG. 5, such that the fibers 44 can be rounded at their lower ends to form lenses of the proper focal length instead of using separate lenses 42. Also, the fibers 44 can be illuminated in groups, successively, if the intensity of the laser 54 is not great enough to illuminate them all at one time.

While the apparatus of FIG. 5 is designed to impress the entire pattern or matrix onto the tape 10 at one time, it is possible to scan the matrix with a single laser beam and impress the spots onto the tape successively, as shown in FIG. 6.

In FIG. 6 is shown again the tape 10 with plastic base 36 and opaque layer 38, and the matrix board 40 of lenses 42 as shown in FIG. 5. However, instead of impressing the light 55 from laser 54 simultaneously to all points in the matrix, the laser beam 55 is passed through modulator or control 52, and as beam 72 to a first rotating mirror 60 driven by motor 62 and then as beam 74 to a second rotating mirror 64 with drive motor 66. The two mirrors are set with their axes at right angles, respectively parallel to the two orthogonal axes of the matrix of 40. The motors 66 and 62 are synchronous and are driven by means of oscillator 68 and frequency divider 70 in precise ratio of rotation. Thus the two mirrors sweep out a raster of lines superimposed on the rows and columns of the matrix and covering all spots of the matrix board 40. By placing the facsimile card 30 precisely under the board 40, the authentication pattern is impressed on the tape.

In a companion application Ser. No. 60,399, entitled; Preparing Master and Facsimile Digital Spot Records, of one of the co-applicants of this application, filed on Aug. 3, 1970, a method is shown of burning holes in a record through perforations in a master card by scanning the pattern by a single focussed laser beam. Thus a single precise optics can replace the lens board with a plurality of focussing lenses. Such a system would be equally applicable to this invention. Those portions of application Ser. No. 60,399 pertaining to this laser copying procedure are incorporated herein by reference.

In FIG. **4*a* the pattern card or facsimile 30 is shown with circular small holes or perforations 32. In the recording process, shown in FIGS. 5 and 6 this type of pattern is used. However, when it comes to reading the pattern of holes, the tapes are not laterally guided to the precision of the dimensions of the circular holes. Thus, for reading, a slightly different facsimile card is used in which the circular holes are extended, 32′ in FIG. 4*c*, along the direction of the rows 16**. This can be done in the process of copying a master card to a facsimile pattern card by relatively moving the master and the facsimile card along the direction of the rows by increments of a size corresponding to the dimension of the microperforations, and by scanning the surface of the master card between each incremental displacement. Thus, the microperforations in the facsimile card will each comprise a plurality of contiguous circular microperforations, which will comprise, in effect microperforations of elongated shape, the elongation being perpendicular to the direction of record traverse, and being in the direction of record weave or flutter. If the elongated dimension is equal to or greater than the weave of the record within the limits of guidance, then each microperforation in the record will be positively read by the facsimile card irrespective of the weave of the record.

While the most direct method of providing the elongated microperforations is to use a plurality of copying steps, it is also possible, as is well known in the art, to use optical means to change a circular point focus to a line focus. This utilizes combinations of spherical and cylindrical lenses or mirrors, and will provide the elongated oval shape of microperforations desired.

In FIGS. **7*a*, 7*b*, 7*c* and 7*d* are shown a method for coding spot patterns by which differences between the pattern being read and the facsimile pattern can be detected very simply. In FIG. 7*a* is shown the facsimile pattern 154 and in FIGS. 7*b*** and 7*d* two possible tape patterns 156 and 156*a*. A very simple pattern of two rows 160*a*, 160*b* and two columns 158*a*, 158*b* are shown, with four possible spot positions in the matrix. With a redundancy factor of 2, four additional spot positions are shown 160*c*, 160*d* for each column. The logic is as follows. Assume the pattern has two transparent spots (open circles)(158*b*, 160*a*) and (158*a*,160*b*) while the other two possible positions are blank (closed small circles). In the second part of the pattern, rows 160*c* and *d*, the transparent spots and opaque spots are interchanged. In FIG. 7*c* is shown one reading apparatus. Here a lamp, 84, optics 86 in box 82 creates a collimated beam of light 87 directed upwardly through the tape 156 and the facsimile card 154 to another box 160 containing optics 162 and PE sensor 164.

The correct pattern on the tape is the direct opposite of the pattern on the facsimile card 154. That is, transparent and opaque spots are reversed. This can be done by making the reading pattern card a photographic copy of the facsimile card where a negative copy is provided. Thus it will be clear, that if the two patterns are alike, wherever a transparent spot occurs in one, an opaque spot occurs in the other so that when the two overlap there will be no light passed through. On the other hand if the two patterns are not identical, light will pass through to the P.E.S. 164, which will indicate the discrepancy.

Consider the pattern 156*a* to be on the tape. This differs from 154 in having an additional (third) transparent spot at (160*b*, 158*a*). Superimposing the two patterns, it will be seen that light will pass through position (158*a*, 160*b*). Now, consider that instead of one additional transparent spot being present in the tape pattern, there is one less transparent spot present. That is, spot (160*b*, 158*b*) is missing. This is shown in FIG. 7*b* where spot 158*b*, 160*b*) is missing. When the two patterns 154 on the facsimile card and 156 on the film are superimposed, light will pass through (160*d*, 158*b*). Thus, by this system of coding, the patterns on the tape and on the facsimile card must have the exact same number of spots in the same positions to get the proper pass signal, (no light passage), remembering that the patterns are opposite on card and film.

We have, in FIGS. 5 and 6 described two embodiments of apparatus for placing or impressing the authentication patterns on the record. Also, in FIGS. 7*a*, 7*b*, 7*c* and 7*d* we show a method of using one particular coding system whereby the pattern can be read very simply. In FIG. 8 we will further describe an optical system, and in FIGS. 9 and 10 an opto-electronic system for comparing patterns on the tape and the facsimile card.

In FIG. 8 we show the tape 10 with opaque layer 38 over transparent support web 36, and with microperforations 80 represented in the opaque layer. In a housing 82 below the tape is a lamp 84, optics 86 which sends a collimated beam 87 up to the tape, illuminating the perforations 80. Above the tape is optics 92 which images the pattern of illuminated spots 80 onto the facsimile card 30. The light 85 passing through the facsimile card perforations into the housing 83 is compressed by optics 88 onto the photosensor 90. The photosensor 90 acts as an OR gate, by placing a signal on line 96 whenever any one of the perforations in card 30 passes light. This card is of the type coded as in FIG. 7.

To be sure that light is passing through the tape of film, a beam divider 93 takes part of the light passing through the film, and by means of optics 94 compresses it onto photosensor 94. So, when there is light on 95 but no light on 90, we have the correct pattern. A simple logic to handle this condition provides a polarity inverter amplifier 97 which provides a positive signal when no light reaches 90. This signal and the output of sensor 95 both go to an AND gate 99. The AND gate is designed to give an output signal to the control 106 only when the same signal appears on both input leads, that is, when no light falls on 90 and light falls on 95. The signal to the control 106 can operate an alarm 105. Conversely, (as is well known in the art) the control 106 can control the signal input to the computer (CPU). The magnetic reading heads 100, operating against the tape 10 have output signals on line 102 which go to the CPU through relays 103. The coils 107 of the relays are connected to the control 106. Thus when the pattern on the tape matches the pattern on the card, the relay 103 will pull in and permit operation of the C.P.U. Other types of control (symbolized by line 103) can of course be used, as is well known in the art.

We show schematically in FIG. 8 a lamp 83 and reflector 85 illuminating the tape 10 with beam 89. If the spots on the tape are contrasting in color or reflectance, the pattern will be imaged onto the facsimile card as before. Thus the pattern can be read by light transmission or by light reflection.

In FIGS. 7 and 8 the patterns on the tape and card are compared as a whole, and the choice of whether a match is made or not is dependent on whether or not any light reaches the sensor. In FIGS. 9 and 10 we show another system in which separate sensors are provided for each point in the pattern. Proper electronic logic is then provided to compare corresponding points in the pattern to be sure each point location is the same (that is, open or closed, transparent or opaque).

In FIG. 9 we show the tape 10, with opaque layer 38 and translucent or transparent web 36. This passes over lamp housing 82 with lamp 84, optics 86 and collimated beam 87. A plurality of optical fibers 165 leading to PE sensors 167 are arranged in a pattern corresponding to the matrix of possible positions of spots in the pattern on the tape and card. Similarly, a separate lamphouse 82' impresses on a corresponding plurality of optical fibers 166 and PE sensors 168 light that passes through the microperforations of card 30. Signals from the two groups of sensors go by lines 169, 170 to a logic box 172 which signals the control 106 and the CPU 104 as in FIG. 8.

In FIG. 10, we show schematically the sensors 176*a*, 176*b*, 176*c*, etc. from the group 167 responsive to the tape, and corresponding sensors 178*a*, 178*b*, 178*c*, etc. from the group 168, responsive to the card. In general there may be a large number of these but for simplicity we show only three, and will only show the logic connections to two.

Leads 180*a*, 180*b* go from corresponding sensors 176*a* and 178*a* to an AND gate 182*a*, which has an output line 188*a*. When light is applied to both 176*a* and 178*a* positive signals go to 182*a*, and under the condition a positive signal will appear on 188*a*. When both 176*a* and 178*a* are dark, a negative signal appears on their leads 180*a*, 180*b*. But the AND gate only works with positive signals. So parallel leads 184*a*, 184*b* go to polarity inverter amplifiers 186*a*, 186*b* which convert the negative signals to positive signals. These then go to AND gate 182*b*. The output lines 188*a*, 188*b* go to an OR gate 190*a*. The OR gate will put out a positive signal on 192*a* when either one or the other of input leads 188*a*, or 188*b* carries a positive signal.

To review, if both 176*a* and 178*a* are light a positive signal goes from each to 182*a* which then sends a positive signal to 190*a*. If both 176*a* and 178*a* are dark, they put out negative signals which are inverted to positive signals by amplifiers 186*a*, 186*b*. They then go to the AND gate 182*b* and place a positive signal on 190*a*. So, whether the two sensors are both light or both dark the OR gate 190*a* sends a positive signal to the final AND gate 194. If both 176*a* and 178*a* are not alike then 192*a* carries a negative signal. The AND gate 194 has input leads corresponding to each pair of sensors, and if each pair are alike, whether light or dark, a positive signal appears on the corresponding input to 194, and a positive output signal appears on output 196.

Again, as in FIG. 8, we need to know whether a pattern is in position in the tape over the lamphouse 82, so we take leads 198*a*, 198*b*, etc. from sensors 176*a*, 176*b* etc. to OR gate 200. If any one of the sensors shows light, then a positive signal appears through 202 to AND gate 204 which corresponds to AND gate 99 of FIG. 8. Therefore, if any one of the tape sensors shows light and if all pairs of sensors have the same light or dark then positive signals will appear on lines 196 and 202 and gate 204 will send a signal to control 106, and appropriate response can be made as discussed in connection with FIG. 8.

While we speak interchangeably of pattern card, master pattern card and facsimile pattern card in the step of impressing the authentication pattern on the record and the step of reading the authentication pattern and comparing it to the pattern of the pattern card, any of the cards can be used and we will simply call them pattern cards. Also, while we speak generally of patterns of spots, we mean particularly geometric patterns of microscopic spots or microscopic perforations or microperforations, which cannot be precisely read by eye, but can be precisely read by optical means, by comparison with the precisely prepared pattern card from which the pattern on the record medium was originally made.

While a number of embodiments of this invention have been described and illustrated, additional embodiments will be conceived by those skilled in the art based on the principles enunciated, all of which embodiments are considered to be part of this invention, the scope of which is to be determined from the scope of the appended claims.

We claim:

1. An apparatus for authenticating a digital data storage record, comprising, a. means comprising a pattern card means containing a predetermined pattern of microperforations of microscopic size burned through said pattern card means by a pulsed, focussed beam of laser radiation, b. means responsive to said pattern card means to impress on said data storage record an unerasable authentication pattern of microperforations of unique character, unrecognizable by humans, but recognizable by machine reading methods, said pattern transferred from said pattern card means by a continuous focussed beam of laser radiation, and corresponding with the pattern of microperforations on said pattern card means, and c. optical means further responsive to said pattern card means to read said authentication pattern of microperforations on said data storage record and means to compare said read pattern with the pattern of microperforations on said pattern card means.

2. A system as in claim 1 including means responsive to said comparison means to control the reading of data from said data storage record.

3. A system as in claim 1 including a master pattern card and means using said master pattern card to prepare said pattern card, both cards having identical patterns of microperforations.

4. A system as in claim 3 including means to prepare said master pattern card including laser means to burn minute microperforations through said master pattern card.

5. A system as in claim 4 in which said means to prepare said pattern card includes means passing radiation through the microperforations of said master pattern card to create the microperforations on said pattern card.

6. A system as in claim 5 in which said radiation includes radiation from a laser adapted to remove material from said pattern card to provide said transparent spots.

7. A system as in claim 6 in which said laser radiation passing through the microperforations of said master card is adapted to burn off an opaque layer over the areas of said microperforations on said pattern card.

8. A system as in claim 6 in which said laser radiation passing through the microperforations of said master card is adapted to burn microperforations through said pattern card.

9. A system as in claim 8 in which said master card is made of material which evaporates at a higher temperature than does the material of said pattern card, and the laser energy to evaporate the material of said pattern card contains a lower energy beam than that required to evaporate the material of said master card.

10. A system as in claim 1 in which said means for impressing said pattern on said storage record includes laser means adapted to pass radiation through the transparent spots of said pattern card and to evaporate material from an opaque layer on said record to expose the record base material, which base material is transparent to light.

11. A system as in claim 10 in which said record is a magnetic record and said opaque layer is the magnetic material of said record.

12. A system as in claim 11 in which the pattern of spots on said magnetic record is arranged so that said spots lie in the areas of said record not utilized by the magnetic transducing means.

13. A system as in claim 1 in which said record is magnetic and including means to record data on and read data from said record, and to traverse said record past said means to record and to read.

14. A system as in claim 1 in which said record means is photographic.

15. A system as in claim 1 in which said record is a perforated paper-like means.

16. A system as in claim 1 in which said means to record said authentication pattern of spots includes means to record all spots in said pattern simultaneously.

17. A system as in claim 1 in which said means to read said authentication pattern of spots on said record includes means to read all spots in said pattern simultaneously.

18. A system as in claim 1 in which said authentication pattern comprises a first binary pattern of spots and a second identical pattern in which the transparent and opaque spots are interchanged, and in which the comparison means includes means to pass radiation through said record and said pattern card, the first pattern of said record aligned with the second pattern of said pattern card and the second pattern of said record aligned with the first pattern of said card.

19. A system as in claim 1 including means to relatively move said facsimile card and said master card along said rows to create spots elongated in the direction perpendicular to the direction of movement of the record past said pattern card.

20. A system as in claim 1 in which said means to prepare said master pattern card includes optical means to vary the shape of the focussed image of said laser beam to substantially the form of an elongated oval, the elongated dimension in line with the rows of said pattern.

21. The method of authenticating a digital data storage record comprising, a. preparing a pattern card means containing a predetermined geometrical pattern of microperforations, by burning said pattern of microperforations into said pattern card means by means of pulsed focussed laser radiation, b. using said pattern means as a mask, burning on said record an unerasable pattern of microperforations corresponding to said pattern on said pattern card means by passing continuous focussed laser radiation through the microperforations of said pattern card means by scanning said radiation over the surface of said pattern card means, and c. using said pattern card means reading said pattern of microperforations on said record and comparing the read pattern with the pattern of microperforations of said pattern card means.

22. The method as in claim 21 including the additional step of carrying out a predetermined operation on said storage record in response to the results of said comparison step.

23. The method as in claim 21 including the step of preparing a master pattern card, from which said pattern card is prepared, having an identical pattern of spots.

24. The method of claim 21 in which said data record is a long strip record and is adapted to be traversed in a record handling means including transducer means to read the digital data on said record, and including the additional step of stopping the traverse of said record when in the comparison of the authentication pattern on said record to said pattern card, said authentication pattern does not correspond with the pattern on said pattern card.

* * * * *